United States Patent
Li et al.

(10) Patent No.: US 11,861,524 B1
(45) Date of Patent: Jan. 2, 2024

(54) AUTOMATIC INTAKE OF ELECTRONIC MESSAGE CONTENT AND ATTACHMENTS INTO CONTRACT WORKFLOW

(71) Applicant: Ironclad, Inc., San Francisco, CA (US)

(72) Inventors: Jason Li, San Francisco, CA (US); Cai Gogwilt, San Francisco, CA (US); Kevin Verdieck, San Francisco, CA (US); Mary Zhuang, San Francisco, CA (US); Blake Reary, San Francisco, CA (US)

(73) Assignee: Ironclad, Inc., San Francisco, CA (US)

( * ) Notice: Subject to any disclaimer, the term of this patent is extended or adjusted under 35 U.S.C. 154(b) by 521 days.

(21) Appl. No.: 17/003,688

(22) Filed: Aug. 26, 2020

Related U.S. Application Data

(60) Provisional application No. 62/892,330, filed on Aug. 27, 2019, provisional application No. 62/892,295, filed on Aug. 27, 2019.

(51) Int. Cl.
*G06Q 10/10* (2023.01)
*G06Q 50/18* (2012.01)

(52) U.S. Cl.
CPC .......... *G06Q 10/103* (2013.01); *G06Q 50/18* (2013.01); *G06Q 2220/10* (2013.01)

(58) Field of Classification Search
CPC ... G06Q 10/103; G06Q 50/18; G06Q 2220/10
See application file for complete search history.

(56) References Cited

U.S. PATENT DOCUMENTS

| | | |
|---|---|---|
| 6,873,992 B1 | 3/2005 | Thomas |
| 2004/0225571 A1 | 11/2004 | Urali |
| 2008/0243662 A1 | 10/2008 | Subramaniam |
| 2008/0306894 A1 | 12/2008 | Rajkumar et al. |
| 2014/0164542 A1 | 6/2014 | McCabe et al. |

(Continued)

FOREIGN PATENT DOCUMENTS

| | | |
|---|---|---|
| EP | 2909770 B1 | 2/2018 |
| WO | 2013163625 A1 | 10/2013 |
| WO | 2017173187 A1 | 10/2017 |

OTHER PUBLICATIONS

Xiaochun, Fan. "Workflow Automation and Management in the Real Estate Office Automation System." 2009 Third International Symposium on Intelligent Information Technology Application Workshops. IEEE, 2009. (Year: 2009).*

*Primary Examiner* — Carrie S Gilkey
(74) *Attorney, Agent, or Firm* — Banner & Witcoff, Ltd.

(57) ABSTRACT

A method includes receiving, in a first networking platform, an electronic message directed from a first party to a workflow to a second party of the workflow. The method also includes identifying a document attached to the electronic message as relevant to the workflow, and identifying at least a portion of a text content in the electronic message as relevant to the workflow. The method also includes updating the workflow associated with the workflow based on the document attached to the electronic message, when the second party provides the input and storing the document attached to the electronic message in a database, as a new version of the workflow. A system and a non-transitory, computer-readable medium storing instructions to perform the above method are also provided.

15 Claims, 12 Drawing Sheets

(56) References Cited

U.S. PATENT DOCUMENTS

| | | | |
|---|---|---|---|
| 2015/0135300 A1* | 5/2015 | Ford | G06Q 50/18 |
| | | | 726/11 |
| 2015/0215491 A1* | 7/2015 | Faust | H04N 1/00517 |
| | | | 715/780 |
| 2015/0271148 A1* | 9/2015 | Ahari | G06Q 10/06 |
| | | | 713/153 |
| 2018/0005186 A1 | 1/2018 | Hunn | |
| 2018/0060981 A1 | 3/2018 | Sher | |
| 2018/0268506 A1 | 9/2018 | Wodetzki et al. | |
| 2020/0082106 A1* | 3/2020 | Fox | G06F 21/6209 |
| 2022/0006846 A1* | 1/2022 | Kumbi | G06F 3/048 |

* cited by examiner

AUTOMATIC INTAKE OF ELECTRONIC MESSAGE CONTENT AND ATTACHMENTS INTO CONTRACT WORKFLOW

CROSS REFERENCE TO RELATED APPLICATIONS

The present disclosure is related to and claims priority under 35 USC § 1.119(e) to U.S. Provisional Patent Application No. 62/892,330, entitled INTERFACE AND TOOL FOR CONFIGURING A CONTRACT WORKFLOW, and to U.S. Provisional Patent Application No. 62/892,295, entitled AUTOMATIC INTAKE OF ELECTRONIC MESSAGE CONTENT AND ATTACHMENTS INTO CONTRACT WORKFLOW, both to Jason Li et-al., and filed on Aug. 27, 2019, the contents of which are incorporated herein by reference, in their entirety, and for all purposes.

BACKGROUND

Field

The present disclosure generally relates to contract platforms enabling parties to elaborate and execute contractual documentation remotely. More specifically, the present disclosure is related to handling text content and document attachments in electronic messages within the parties and automatically incorporating the document attachments to a contract workflow.

Description of the Related Art

Current contract platforms lack a simple mechanism to incorporate documents and other information handled by a different media into a specific workflow. As a result, when users exchange documents via some alternative medium (e.g., electronic messages and attachments thereof), it is incumbent upon the user to remove and manually incorporate the attachments or other elements in the text content of the message into the smart contract workflow. This is undesirable because it creates extra steps for the users, and has the potential of user error (e.g., misplacement by the user of the wrong document in the wrong workflow).

SUMMARY

In a first embodiment, a computer-implemented method includes receiving, in a first networking platform, an electronic message directed from a first party to a workflow to a second party of the workflow. The computer-implemented method also includes identifying a document attached to the electronic message as relevant to the workflow, identifying at least a portion of a text content in the electronic message as relevant to the workflow, and optionally requesting an input from the second party to update a workflow associated with the workflow. The computer-implemented method also includes updating the workflow associated with the workflow based on the document attached to the electronic message, when the second party provides the input and storing the document attached to the electronic message in a database, as a new version of the workflow.

In a second embodiment, a system includes a memory storing instructions, and one or more processors configured to execute the instructions. The instructions, when executed by the one or more processors, cause the system to receive, in a first networking platform, an electronic message directed from a first party to a workflow to a second party of the workflow, to identify a document attached to the electronic message as relevant to the workflow, to identify at least a portion of a text content in the electronic message as relevant to the workflow, to request an input from the second party to update a workflow associated with the workflow, to update the workflow associated with the workflow based on the document attached to the electronic message, when the second party provides the input, and to store the document attached to the electronic message in a database, as a new version of the workflow.

In a third embodiment, a computer-implemented method includes receiving, in a pre-selected client account, an electronic message forwarded from a user affiliated with a client, wherein the electronic message includes an attached workflow or context relevant to an existing workflow. The computer-implemented method also includes transmitting a second electronic message to the user requesting a selection between multiple options, based on the attached workflow or context, starting a new workflow associated with the attached workflow when the user selects a first one of the options, updating documents in the existing workflow when the user selects a second one of the options, and uploading a signed copy of the attached workflow to the existing workflow when the user selects a third one of the options.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A and 4B illustrate dashboard displays of an electronic message thread including document attachments in a contract platform, according to some embodiments.

In the figures, elements and steps denoted by the same or similar reference numerals are associated with the same or similar elements and steps, unless indicated otherwise.

DETAILED DESCRIPTION

Figure 1:
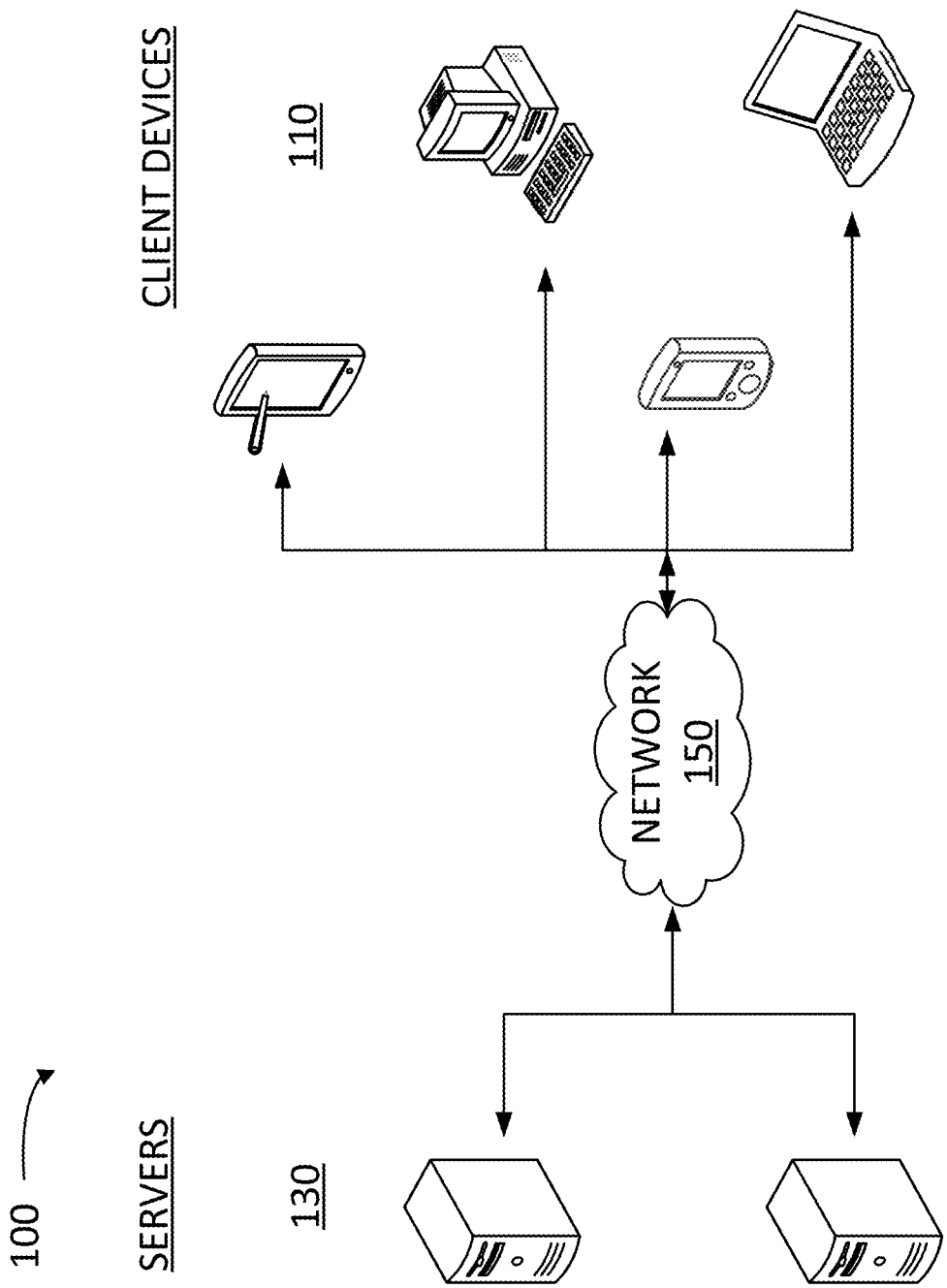
FIG. 1 illustrates an example architecture suitable for a smart contract workflow environment, according to some embodiments.

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in the Appendix (13 pp), filed concurrently herewith.

General Overview

In contract platforms and other network applications where documents are exchanged and edited between multiple users, the availability of multiple networking platforms may create confusion as to which version of a document is circulating on electronic messages, which version is the most updated and legitimate version, and which version is stored in a database. The disclosed system addresses this problem specifically arising in the realm of computer technology by providing a solution also rooted in computer technology, namely, by providing a centralized verification process in which multiple networking platforms (e.g., electronic message, chat, and the like) are monitored by a centralized server. In some embodiments, the monitoring involves data encryption and use of related technologies to verify that source and recipients of electronic messages are legitimate parties to the contract, and the contract or other documents exchanged between parties are not tampered with or eavesdropped by an external, illegitimate, or unauthorized party.

It is desirable that document handling in a contract platform be as frictionless as possible. In some embodiments, users may be tempted to, or naturally tend to, use multiple tools in the handling of a contract. Typically, this causes a loss of context when the consistency checks, documents updates, and unification steps are taken manually by one of the parties to the contract. In embodiments as disclosed herein, a workflow is created to handle a contract, and any further negotiation occurring over e-mail or any other electronic messaging tools are seamlessly incorporated into the workflow. This preserves a comprehensive scope of contract context within the platform, and provides the ability for verification to all parties. In some embodiments, an inbox tool brings information and documents sent via e-mail or any other electronic messaging tool into the contract platform workflow. This makes it easier to bring the process that happens outside of the contract platform back into the workflow in a manner that is available to all parties having access to it.

Embodiments as disclosed herein provide a technical solution to the technical problem arising in the realm of computer network technology where a document exchange between multiple collaborating parties requires verification and update between multiple versions of the document that may be circulating via electronic messaging. In addition, embodiments as disclosed herein enable the seamless approval of the workflow at different stages by automatic control of the signatures and other verification steps.

In embodiments as disclosed herein, an electronic message may include an electronic message, a chat message, an instant message, a data-enhanced text message, and the like. More generally, an electronic message as disclosed herein may include any type of remote communication between one or more parties, wherein a text document or a printed document may be electronically exchanged and/or altered between the parties.

Example System Architecture

FIG. 1 illustrates an example architecture 100 suitable for a smart contract workflow environment, according to some embodiments. Architecture 100 includes servers 130 communicatively coupled with client devices 110 over a network 150. One of the many servers 130 is configured to host a memory including instructions which, when executed by a processor, cause the server 130 to perform at least some of the steps in methods as disclosed herein. In some embodiments, the processor is configured to manage a contract workflow upon request by the user of one of client devices 110. The contract workflow may include a contract document, and one or more counterparties that are signatory to the contract. Accordingly, server 130 may include an editor tool configured to create and modify documents in the contract workflow. For purposes of load balancing, multiple servers 130 can host memories including instructions to one or more processors, and multiple servers 130 can host a database that includes multiple contract workflows. Moreover, the contract workflow may be a collaborative project involving multiple users with client devices 110 accessing one or more servers 130 where one or more project documents are stored. In that regard, the user of client device 110 may be an enterprise owner, official, or supervisor, requesting server 130 to generate a contract workflow. In some embodiments, the user of client device 110 may be one or more collaborators assigned with at least one of multiple tasks in the contract workflow by server 130. Moreover, in some embodiments, multiple users of client devices 110 may include the project master and at least one collaborator assigned with a task in the contract workflow. Further, in some embodiments, a user of client device 110 is an executor or counterparty to the contract in the contract workflow. Accordingly, client devices 110 may communicate with each other via network 150 and through access to server 130 and resources located therein.

Servers 130 may include any device having an appropriate processor, memory, and communications capability for hosting the contract engine including multiple tools associated with it. A server 130 may be accessible by various client devices 110 over network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the contract engine on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like. Network 150 may include a wired network (e.g., via fiber optic or copper wire, telephone lines, and the like) or wireless network (e.g., a cellular network, radio-frequency—RF-network, Wi-Fi, Bluetooth, and the like).

Figure 2:
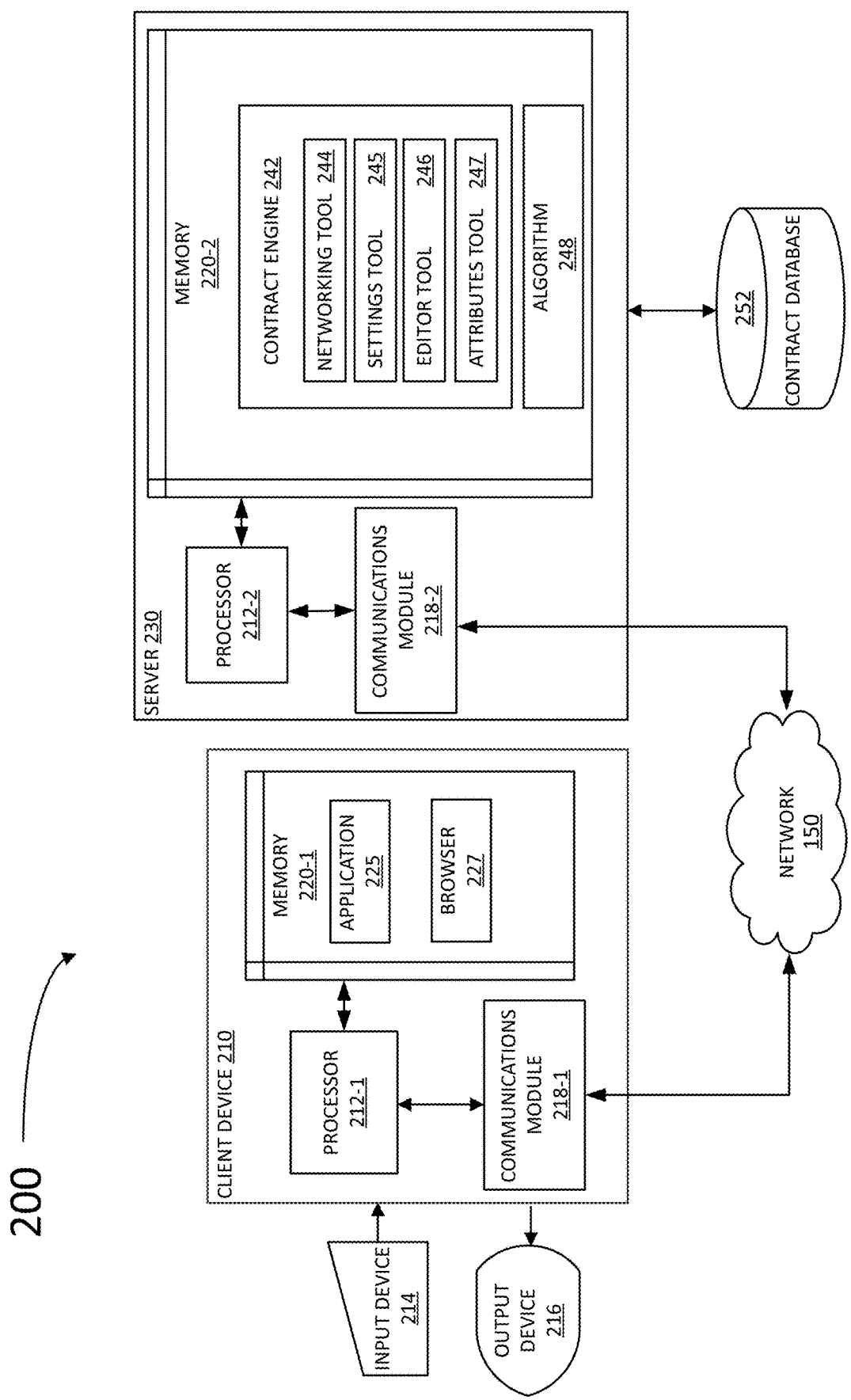
FIG. 2 is a block diagram illustrating an example server and client from the architecture of FIG. 1, according to certain aspects of the disclosure.

FIG. 2 illustrates an exemplary network architecture to provide a contract platform 200, according to some embodiments. Smart contract platform 200 includes a client device 210 and a server 230 communicatively coupled through network 150. Embodiments as disclosed herein provide contract platform 200 through a contract engine 242 in a memory 220-2 of server 230. Smart contract platform 200 serves enterprises and individuals who subscribe to the service, to create, manage, and store legal contracts with other counterparties. Each of the enterprise, individual, or any subscriber to the contract platform may access the platform through a client device as shown in the figure. Likewise, a counterparty to the contract may also receive and execute the contract from contract platform 200 via client device 210 communicatively coupled with the server. In some embodiments, a server as disclosed herein may also include an electronic messaging platform (e.g., an e-mail server) providing communication functionality between multiple client devices in the network.

Client device 210 may be any one of a mobile device, a laptop, a desktop, a palm or pad device, and the like. Server 230 may be a computing device such as a workstation, including one or more desktop computers or panels mounted on racks, and the like. The panels may include processing boards and also switchboards, routers, and other network devices. Client device 210 and server 230 may access each other and other devices in the network via communications modules 218-1 and 218-2 (hereinafter, collectively referred to as "communications modules 218"). Communications modules 218 may include radio hardware and software such as RF antennas, analog circuitry, digital to analog conversion circuits, and digital signal processing circuitry. In some embodiments, each of the client device or the server may be coupled to at least one input device 214 and an output device 216. Input device 214 may include a mouse, a keyboard, a pointer, a stylus, a touchscreen display, and a microphone. Output device 216 may include a display (e.g., the same touchscreen display as the input device), a speaker, an alarm, and the like.

Client device 210 and server 230 are generally computing devices, each of which includes at least a memory 220-1 or 220-2 (hereinafter, collectively referred to as "memories 220") storing instructions and a processor 212-1 or 212-2 (hereinafter, collectively referred to as "processors 212") configured to execute the instructions to perform, at least partially, one or more steps as described in methods disclosed herein. For example, memory 220-1 may include a browser 227, and a network application 225 hosted by server 230. Browser 227 or network application 225 may include commands for accessing contract platform 200 hosted by contract engine 242 stored in memory 220-2. Further, browser 227 or network application 225 may be configured to display a contract dashboard for a user of client device 210, upon access of a smart contract in contract engine 242. The contract dashboard may include multiple visual features and actionable icons and buttons that enable a party to review, edit, approve, or reject a contract in the contract platform via client device 210. The user of client device 210 may also send the contract workflow or at least a version of the contract workflow to a second party to the contract (e.g., a supervisor, and approver, or a counterparty), via the network. In that regard, at least one or more versions of the contract workflow may be stored in any one of memories 220, or in a contract database 252 communicatively coupled to server 230 and to client device 210 through network 150. Network application 225 may also include an electronic messaging application (e.g., an e-mail application, chat or instant messaging application, and the like) configured to send e-mails, chats, and instant text messages to other client devices through network 150.

Contract engine 242 includes multiple tools for execution by processors 212 to provide a contract platform as disclosed herein. Some of the tools in contract engine 242 may include a networking tool 244, a settings tool 245, an editor tool 246, and an attributes tool 247. Networking tool 244 may be configured to interact with the electronic messaging application in client device 210 to automatically include document attachments into a contract workflow so that different parties in a contract may exchange different versions of a document for review and signatures, seamlessly and transparently. In some embodiments, networking tool 244 may be part of a second server that is dedicated to electronic messaging through the network and that is communicatively coupled with contract engine 242 in server 230. Networking tool 244 may include a client account configured to receive e-mails from members of a client organization. The second server may be configured to communicate with the contract platform to handle attachments and documentation (including the content of forwarded messages) into new or existing workflows for contract documents. The contract documents may include contracts between the client organization and a third party. Accordingly, any member of the client organization may receive an electronic message from the third party, including context or attachments relevant to one or more contract workflows. In some embodiments, the member of the client organization may not have direct access to the contract platform, or may not be familiar with the procedures and technicalities of the contract engine. Accordingly, the member of the client organization may simply forward the electronic message received from the third party to the client account, so that the context of the electronic message and/or any relevant document may be seamlessly incorporated into a new or already existing workflow automatically, by networking tool 244.

Settings tool 245 may enable a user to create, update, or edit different configurations of a contract workflow, such as conditions, counterparties, reviewers, preferences, and access privileges to the contract workflow. Editor tool 246 may include a document editor tool (e.g., a text editor application and the like), configured to create, update, and edit a text version of a contract document. In some embodiments, editor tool 246 may allow maintaining different versions of a contract document, or a redlined version of a contract document. Moreover, in some embodiments, editor tool 246 may allow a user to select any two versions of a document and create a redline version based on a comparison of the two selected versions. Attributes tool 247 enables a user to select contract properties such as counterparties, dates, governing law, and jurisdictions. In some embodiments, attributes tool 247 may also enable the user to set up logical conditions and other requirements to the contract workflow. For example, in some embodiments, a logical condition may include selection of specific template language in a contract document (e.g., via editor tool 246) when the user selects a specific governing law, or location, or contract type. In this regard, the different tools in contract engine 242 collaborate with each other in a contract workflow to create a smooth and seamless workflow environment for the creators and issuers of the contract document, and also for the counterparties who sign/edit the contract document.

In some embodiments, memory 220-2 may include an algorithm 248 or code that includes mathematical and logical operations for the different tools in contract engine 242. Algorithm 248 may include a non-linear algorithm such as a neural network, an artificial intelligence, or machine learning algorithm, and is configured to resolve specific tasks according to a previous training using a carefully selected sampling universe. Some of the tasks for which algorithm 248 is trained may include semantic and syntax interpretation of a text, comparison between text documents, and correlating a text with a legal code to ensure that the text is consistent and complies with certain aspects of the legal code. In some embodiments, algorithm 248 may also include an encryption code configured to provide certificates, keys, and signatures to multiple users. Algorithm 248 may be configured to authenticate the certificates or signatures in documents returned by users, so that any tampering with the document or any unauthorized access may be identified and avoided.

Figure 3:
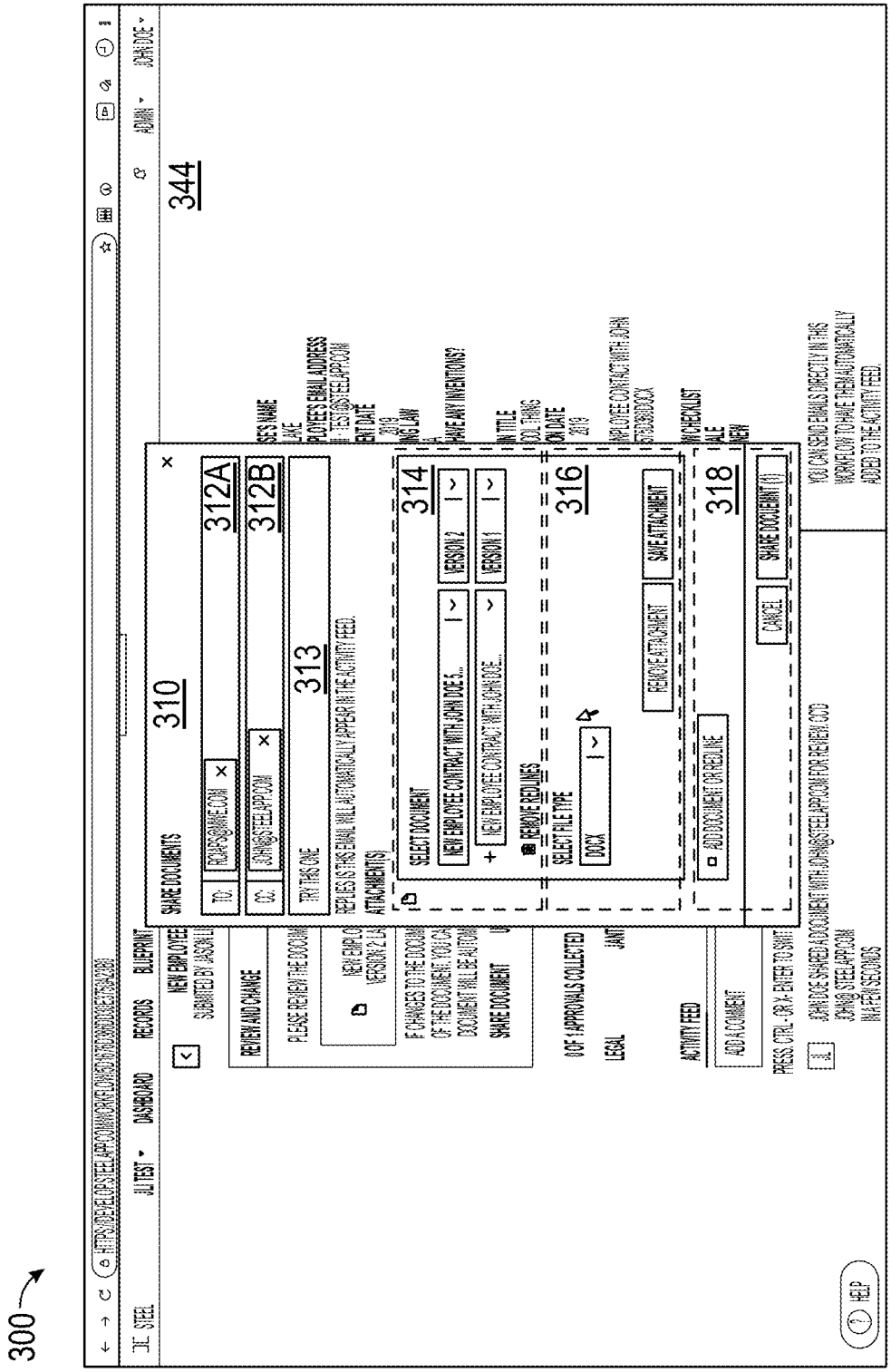
FIG. 3 illustrates a dashboard display of an electronic message from a networking tool in a contract platform, according to some embodiments.

FIG. 3 illustrates a dashboard display 300 of an electronic message 310 from networking tool 344 in a contract platform, according to some embodiments. Dashboard display 300 may be provided by a network application or browser accessing the contract engine in a server from a client device (cf. network application 225, browser 227, client device 210, contract engine 242 and server 230). In some embodiments, electronic message 310 is configured with addressee fields 312a and 312b (hereinafter, collectively referred to as "addressee fields 312"), a message field 313, and a field 314 to select a document attachment (e.g., a version of the contract). The user of the client device accessing the contract engine in the server may be a party to, or a preparer of, the contract, and have an account in the server. The recipient of the electronic message may be a second party to the contract, or a user with the role of approver of the contract. In some embodiments, a contract platform as disclosed herein may be configured to verify that, when a contract document is attached to electronic message 310, the recipients in addressee fields 312 are parties to the contract, or have otherwise authorization to receive and open the contract as an attachment (e.g., an approver or preparer of the contract).

In some embodiments, networking tool 344 is activated from the contract engine and it automatically selects the addresses in addressee fields 312, based on the counterparties or approvers associated with a contract to which the user is a party or a preparer. In some embodiments, the user may be a party to, or a preparer of, more than one contract. In such case, some embodiments may verify the recipient list of the electronic message based on the specific contract document attached to electronic message 310. Electronic message 310 may also include a field 316 to select a type of attachment (e.g., a contract draft or ancillary document or affidavit), and a field 318 to indicate whether to add the document. In some embodiments, networking tool 344 will save replies to electronic message 310 in a log history of the contract workflow in a database (e.g., contract database 252). More generally, in some embodiments, networking tool 344 stores the entire messaging thread to which electronic message 310 is a part of, in the database.

Figure 4A:
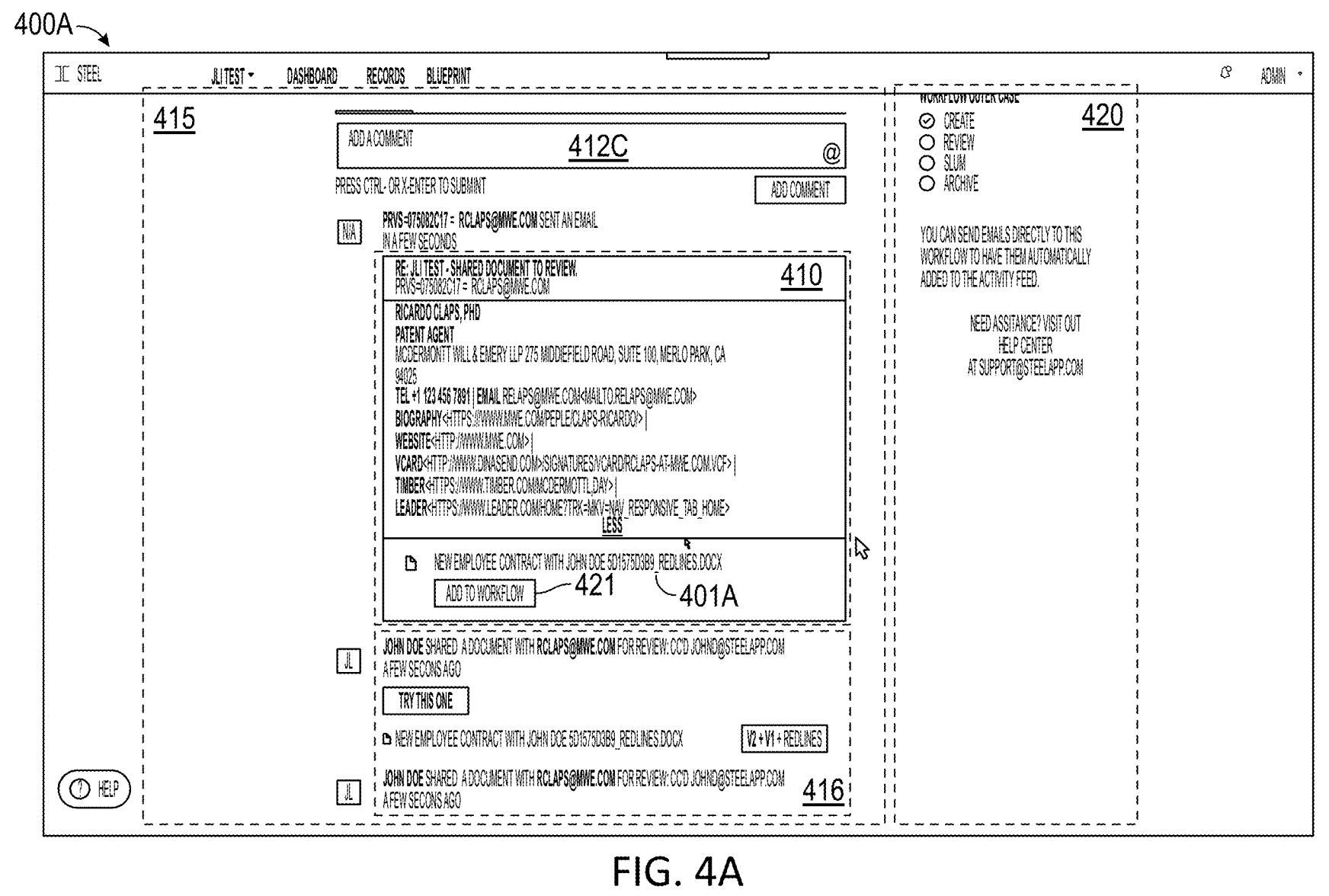
Figure 4B:
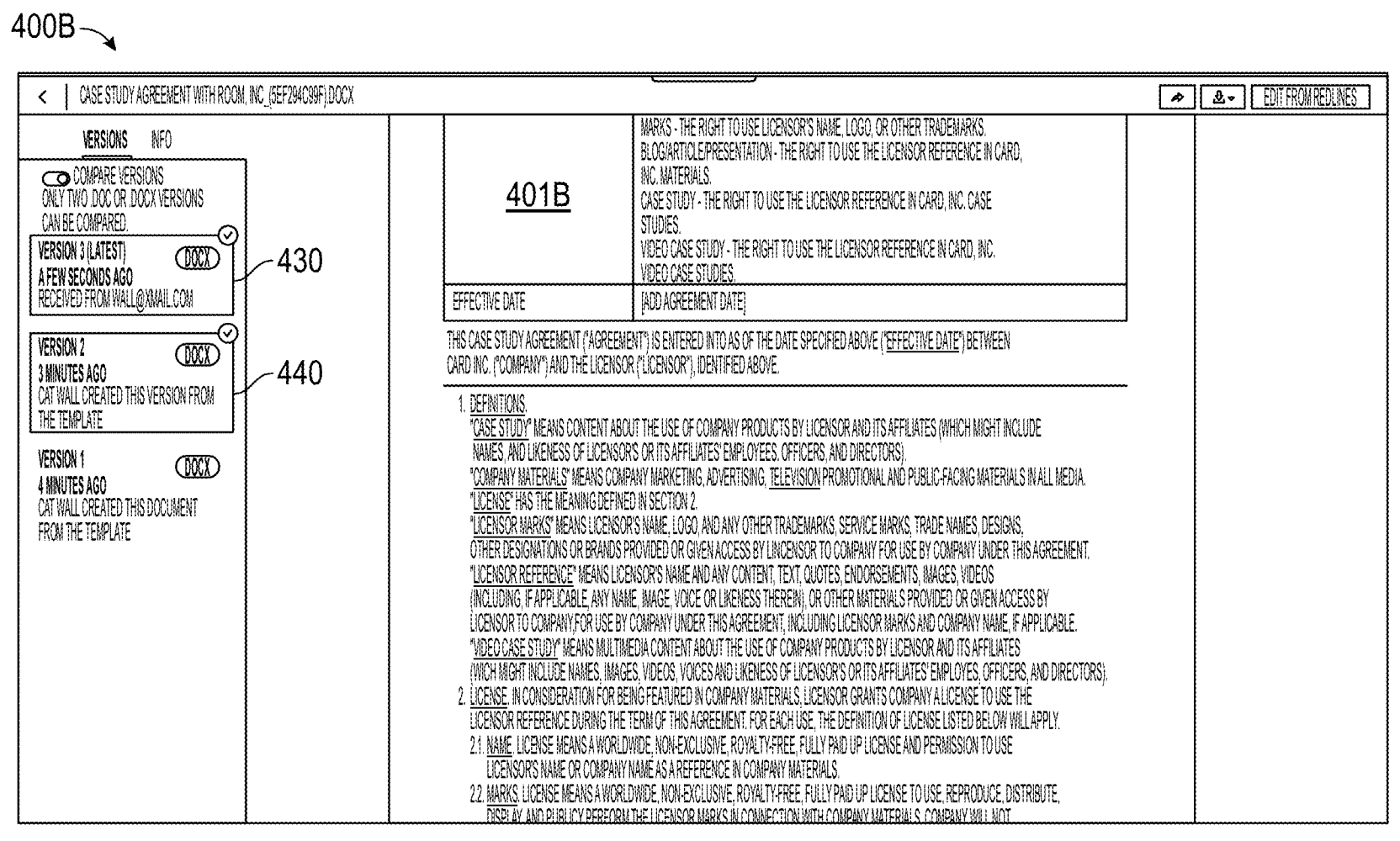

FIGS. 4A and 4B illustrate dashboard displays 400A and 400B (hereinafter, collectively referred to as "dashboard displays 400") of an electronic message thread including document attachments in a contract platform, according to some embodiments.

FIG. 4A illustrates a dashboard display 400A of an electronic message thread 415, including document attachments 401A in a contract platform, according to some embodiments. Dashboard display 400 may be provided to a network application in a client device by a networking tool in a contract engine as disclosed herein (e.g., client device 210, network application 225, networking tool 244, and contract engine 242). Electronic message thread 415 may include an "X-ray" view of one electronic message 410 received by the user. The X-ray display includes metadata associated with electronic message 410 (e.g., sender address, date, time, and the like) and a listing of the attachments (e.g., a draft of contract 401). Dashboard display 400 includes an "Add to Workflow" button 421 next to attachment 401, for user selection. When the user selects the Add to Workflow button 421, the networking tool opens attachment 401A and activates a search for action items within attachment 401A (e.g., redline edits, signature fields, approval tabs and checkmarks, and the like) to update and incorporate attachment 401 into a contract workflow. In some embodiments, dashboard display 400 may include different versions of "Add to Workflow" button 421, without deviating from the general concept of incorporating attachment 401 and/or the message content into an already existing contract flow.

To open attachment 401, the contract engine executes one or more algorithms (e.g., algorithm 248) to verify that the document is legitimate (e.g., the source of attachment 401A is a known client device using a known and legitimate operating system). In some embodiments, to verify legitimacy of attachment 401, the contract engine may apply a private encrypted key to a public key in the client device or in attachment 401A. When the keys match, attachment 401A opens and the user may access it knowing that it is a legitimate document from one of the parties to the contract.

In some embodiments, electronic message thread 415 may also include a field 416 listing prior electronic messages in the thread. Field 416 may include a brief description of the messages (e.g., party A sent a message to party B, X seconds/minutes/hours/days ago), and links to prior versions of attachment 401A included in the prior electronic messages. In some embodiments, dashboard display 400 may also include a workflow checklist 420 indicative of a given status of the contract workflow in electronic message thread 415 (e.g., "create," "review," "sign," and "archive"). For example, in a "create" status, the user may include a preparer of a contract, in a "review" status, the user may include an approver of the contract, in a "sign" status, the user may include a party or counterparty to the contract, and in an "archive" status, the user may include a preparer of a new contract. Accordingly, the user accessing dashboard display 400 may have an overview of the workflow status while reviewing electronic message thread 415. In addition, workflow checklist 420 may include a tab that the user may activate to send one or more electronic messages in electronic message thread 415 to a workflow record in a database (e.g., contract database 252), to be added to a workflow feed. A field 412c may enable the user to include comments in electronic message thread 415. In some embodiments, the contract platform may incorporate the comments into a workflow based on the context of the comment (e.g., using an algorithm as algorithm 248).

FIG. 4B illustrate dashboard display 400B of an electronic message thread including document attachments in a contract platform, according to some embodiments. Dashboard display 400B may include multiple versions 430 or 440 of a contract document 401B, which a user can select for review.

Figure 5:
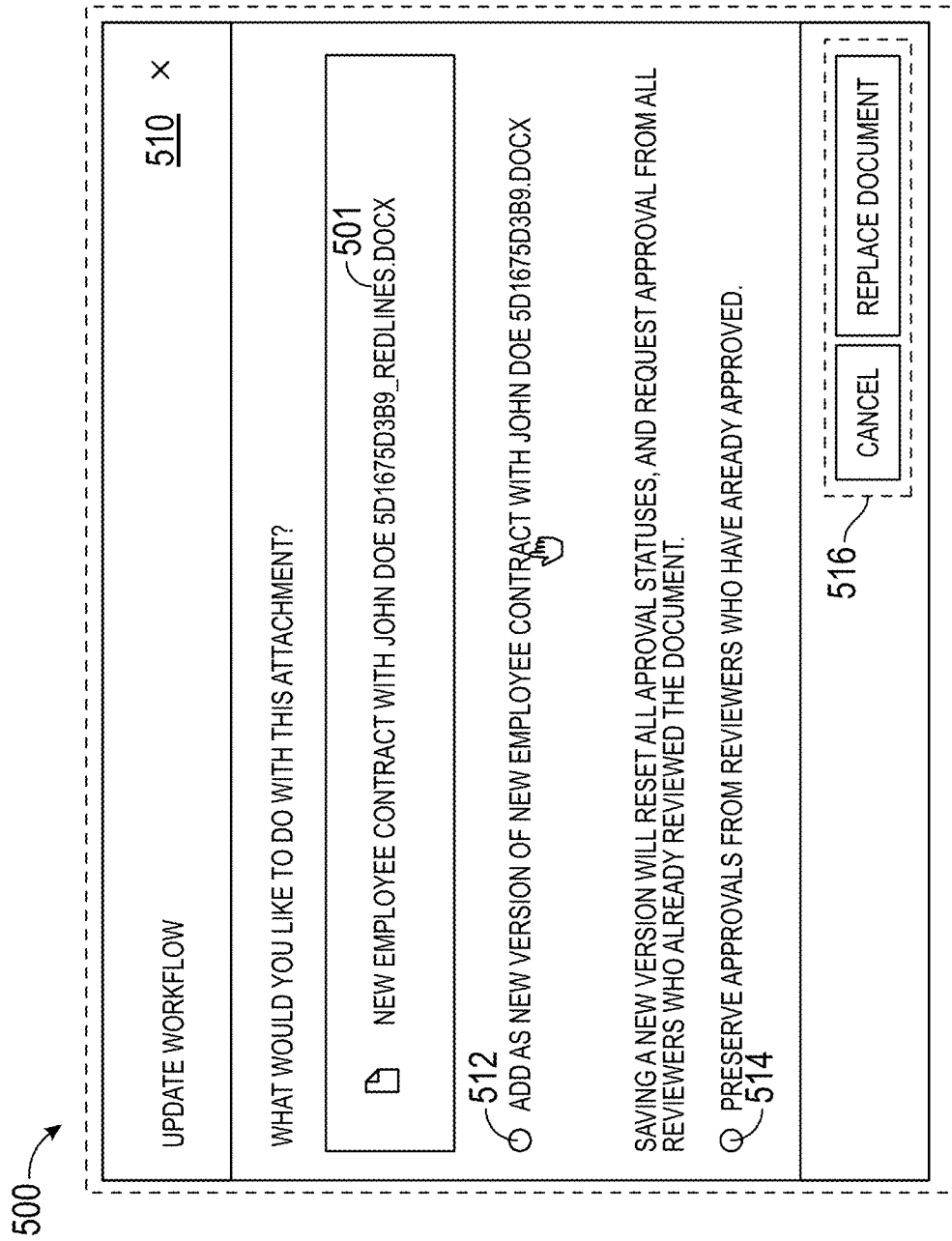
FIG. 5 illustrates a dashboard display of an update workflow prompt in a networking tool in the dashboard of a contract platform, according to some embodiments.

FIG. 5 illustrates a dashboard display 500 of an update workflow prompt 510 provided by a networking tool in a contract platform (e.g., networking tool 244), according to some embodiments. Update workflow prompt 510 may request the user input as to whether an attached document 501 and a text content of an electronic message are part of a new workflow, or if attached document 501 should replace an already existing document in an existing workflow.

When attached document 501 and/or the text content of the message are part of a new workflow, a contract engine (e.g., contract engine 242) resets the approval status for the contract, and requests approval from the reviewers (whether or not the reviewers have reviewed and approved prior versions of the document, if these exist). When attached document 501 or the text content of the message replace an existing document (e.g., by checking tab 516), the contract engine saves attached document 501 as a new version 512, preserving the old version. In some embodiments, the new version 512 is added as a new encrypted block in a database (e.g., contract database 252). In some embodiments, the networking tool may further query whether prior approvals of the existing document should be preserved in the new version by checking a tab 514. This may be the case when edits to a new version merit a renewed approval from all parties to the contract. In some embodiments, such a decision may be left to the users, and in some embodiments, the contract engine may be configured to automatically assess the relevance of the changes to the contract (e.g., vis-à-vis existing law on the subject in a given jurisdiction) using an algorithm (e.g., algorithm 248).

Figure 6A:
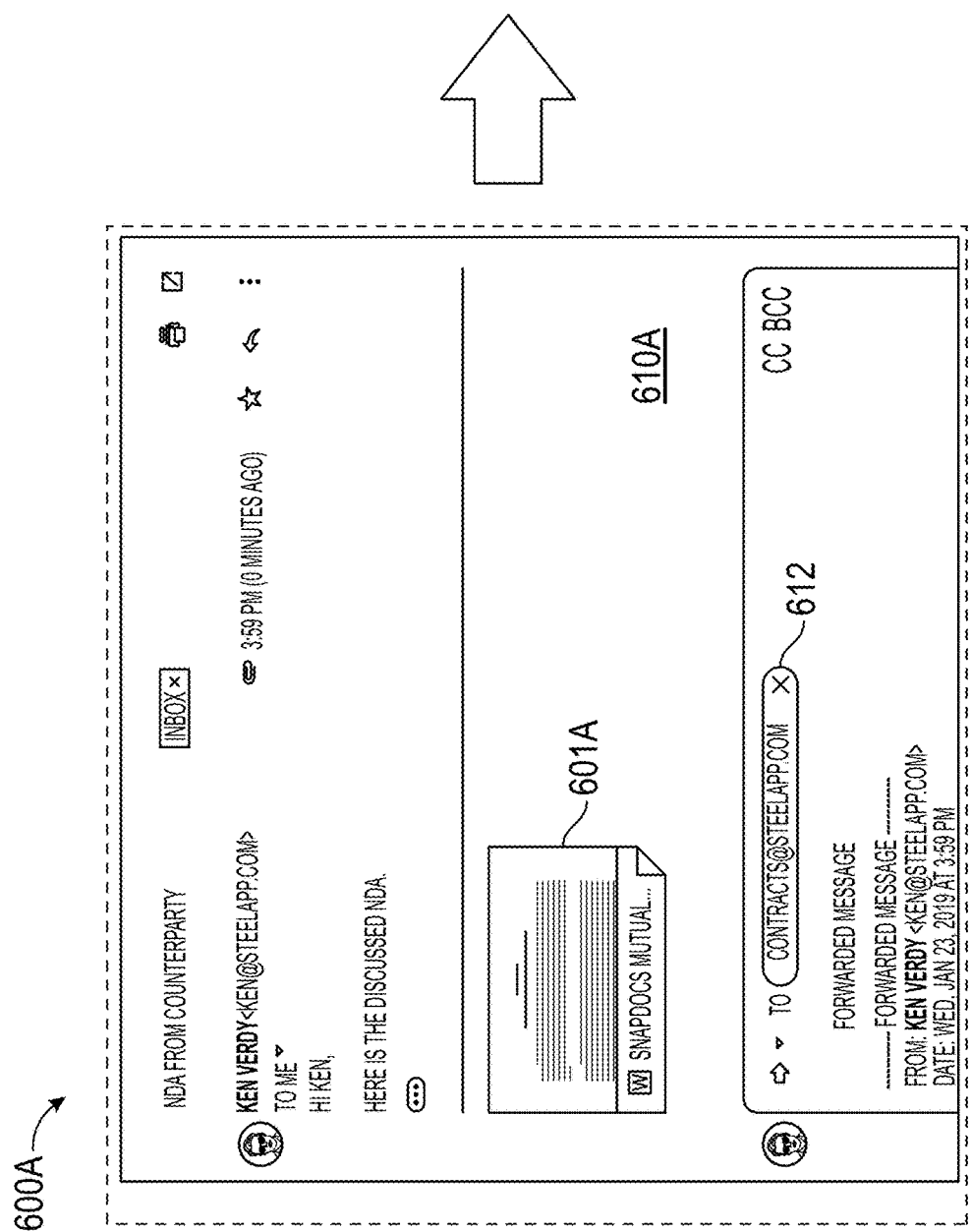
FIGS. 6A and 6B illustrate a message inbox for a user of a contract platform, according to some embodiments.
Figure 6B:
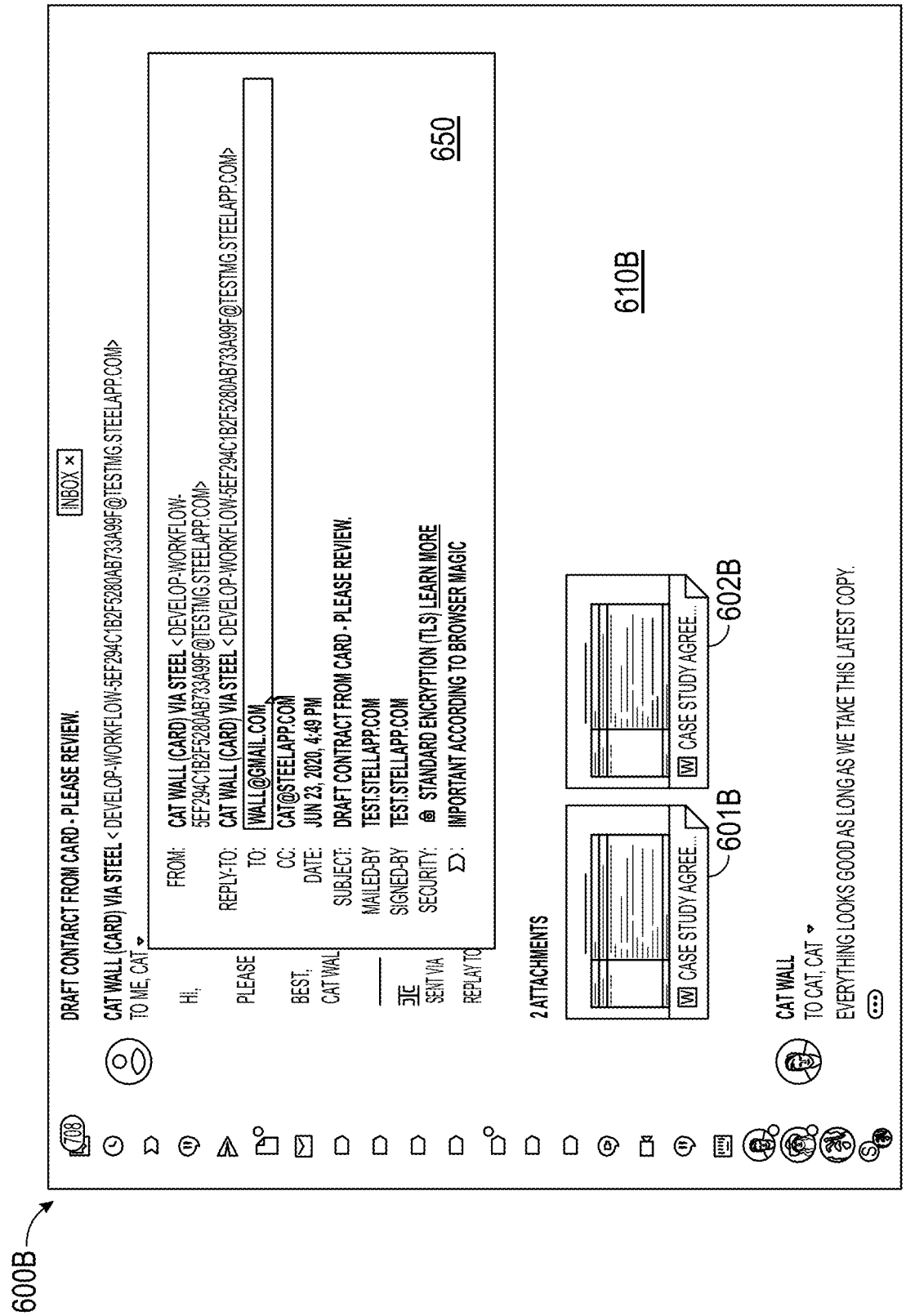

FIGS. 6A and 6B illustrate message inboxes 600A and 600B (hereinafter, collectively referred to as "inboxes 600") for a user of a contract platform, according to some embodiments.

FIG. 6A illustrates a message inbox 600A for a user of a contract platform, according to some embodiments. In some embodiments, message inbox 600A is handled by a networking tool in a contract engine, in a server such as described above (e.g., networking tool 244, contract engine 242, and server 230). In some embodiments, message inbox 600A is displayed in an output device coupled to a client device handled by the user and running a browser or network application installed therein (e.g., output device 216 and client device 210, application 225 and browser 227).

Message inbox 600A may include an electronic message 610A. In some embodiments, electronic message 610A is forwarded from a user affiliated with the client (e.g., a member of the client organization). Electronic message 610A may include an attached contract 601A or context relevant to an existing workflow. The networking tool then transmits a second electronic message 621 to the user requesting a selection between multiple options 623-1, 623-2, 623-3, and 623-4 (hereinafter, collectively referred to as "selections 623") based on attached contract 601A or context. In some embodiments, the contract engine identifies one or more existing workflows associated with the client in a contract database, by an algorithm (cf. algorithm 248) or an identifier based on attached contract 601A or the context of electronic message 610A. In some embodiments, to transmit electronic message 621, the contract engine adds a preview link to the one or more existing workflows for the client that may be relevant to the attached contract or context.

In option 623-1, the contract engine starts a new workflow associated with the attached contract. In some embodiments, option 623-1 is desirable when a third party requests an original contract, and the user desires the contract engine to route the request for appropriate legal approval, e-signature, and file storage in a database (e.g., database 252). In option 623-2, the contract engine updates documents in an existing workflow of relevance to electronic message 610A. In option 623-3, the contract engine may upload a signed copy of the attached contract to the existing workflow, identified as above. In option 623-4, the user may upload a recently updated workflow in the database. In some embodiments, the user may select one or more (e.g., all) of options 623. In some embodiments, electronic message 610A may include a system e-mail address 612 for responding.

FIG. 6B illustrate message inbox 600B for a user of a contract platform, according to some embodiments. Inbox 600B enables an e-mail recipient to select reply targets from a pull-down menu 650. An attachment field 610B may include multiple versions 601B and 602B of a document (including a redline version 602B).

Figure 7:
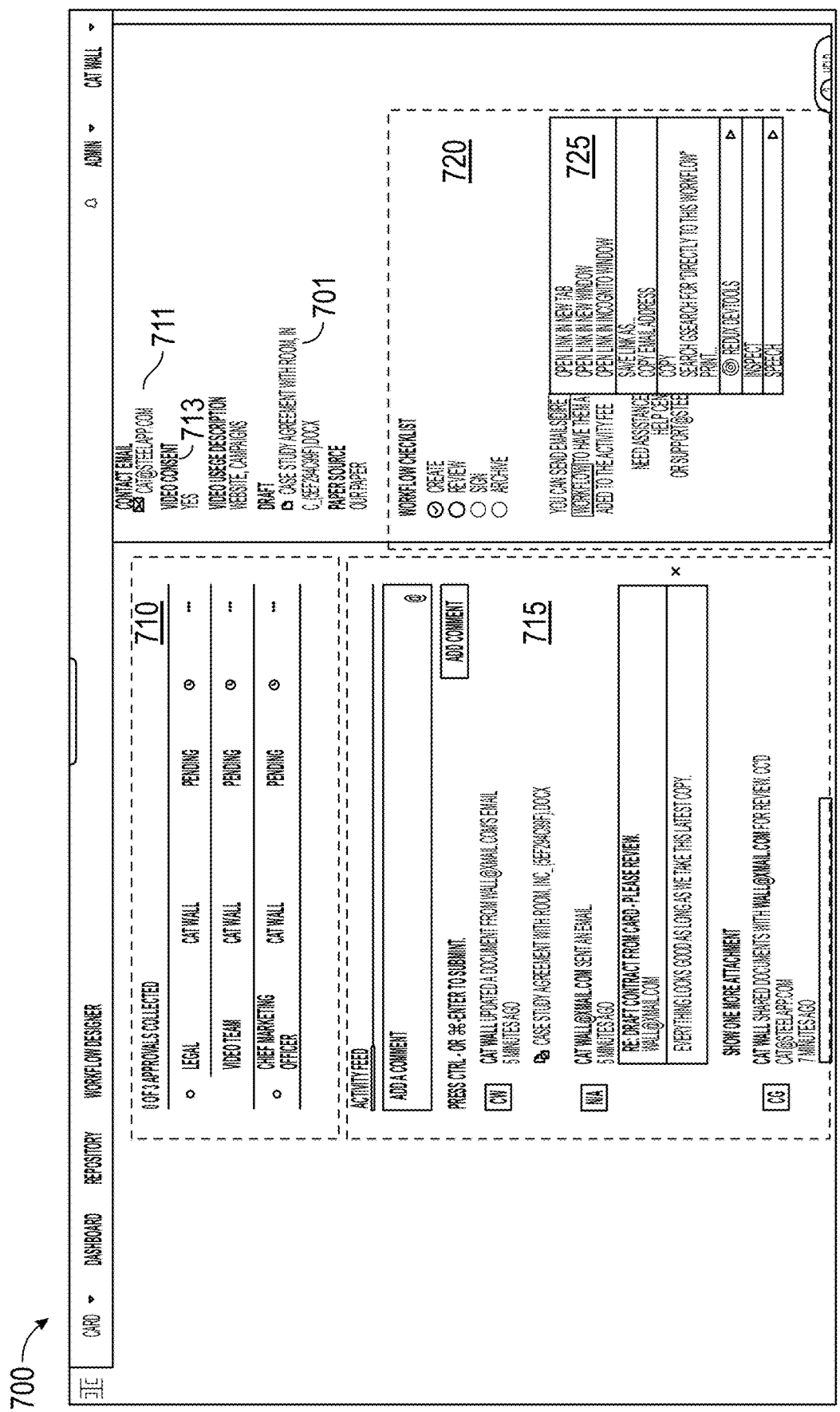
FIG. 7 illustrates a dashboard display with an electronic message thread including a workflow checklist, according to some embodiments.

FIG. 7 illustrates a dashboard display 700 with an electronic message thread 715 including a workflow checklist 720, according to some embodiments. Dashboard display 700 may also include a list 710 of approvals to the workflow, and other data such as contact e-mail addres 711, content description 713 and a link to a draft document 701. Workflow checklist 720 may include a pull-down menu 725 with optional actions for the user.

Figure 8:
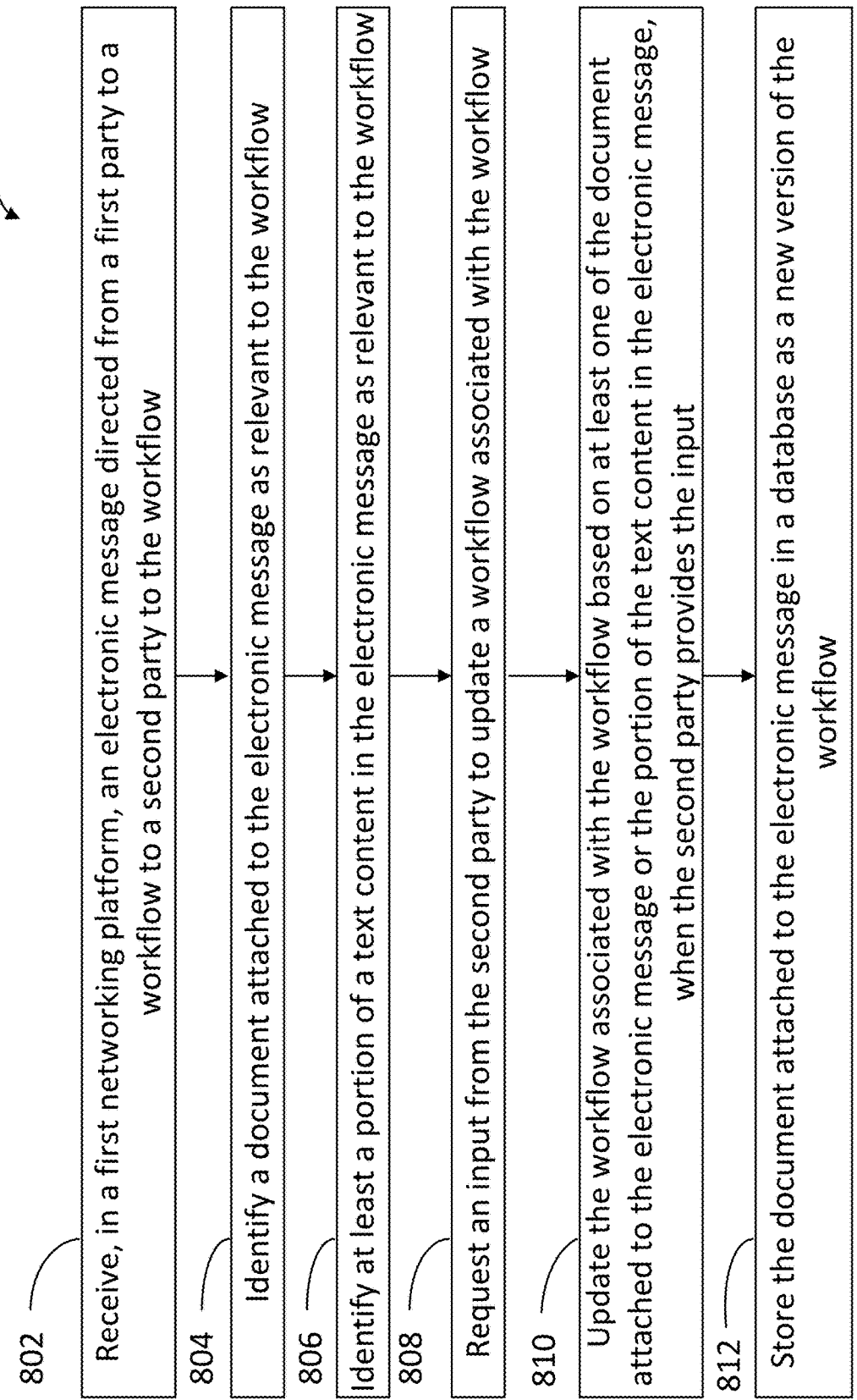
FIG. 8 is a flow chart illustrating steps in a method for receiving and managing electronic message attachments between parties in a smart contract network, according to some embodiments.

FIG. 8 illustrates steps in a method for receiving and managing electronic message attachments between parties in a smart contract network, according to some embodiments. Method 800 may be performed at least partially by any one of the server and client device illustrated in FIGS. 1 and 2. For example, at least some of the steps in method 800 may be performed by one component in a system including a client device running code for a browser and an application to access the server or the database (e.g., contract engine 242, browser 227, or algorithm 248). Accordingly, at least some of the steps in method 800 may be performed by a processor executing commands from tools and algorithms stored in a memory of the server or of the client device, or accessible by the server or by the client device (e.g., processors 212, memories 220, networking tool 244, settings tool 245, editor tool 246, attributes tool 247, and algorithm 248). Further, in some embodiments, at least some of the steps in method 800 may be performed overlapping in time, almost simultaneously, or in a different order from the order illustrated in method 800. Moreover, a method consistent with some embodiments disclosed herein may include at least one, but not all, of the steps in method 800.

Step 802 includes receiving, in a first networking platform, an electronic message directed from a first party to a workflow to a second party of the workflow. In some embodiments, step 802 includes accessing an electronic message thread between the first party to the workflow and the second party to the workflow, the electronic message thread supported by a second networking platform. In some embodiments, step 802 includes automatically updating an electronic message after syncing an electronic message account from the user affiliated with a client. More generally, in some embodiments step 802 may include receiving an electronic message from a first party to the workflow to multiple independent parties in the workflow. Moreover, in some embodiments, step 802 may include receiving an electronic message from multiple parties to a second party in the workflow. And in some embodiments step 802 may include receiving an electronic message from multiple parties to other multiple parties in the workflow (e.g., via a group chat and the like).

Step 804 includes identifying a document attached to the electronic message as relevant to the workflow. In some embodiments, step 804 includes matching a metadata in the document with an updated version of the workflow stored in the database. In some embodiments, step 804 includes verifying that the document attached to the electronic message has not been tampered by an unauthorized third party.

Step 806 includes identifying at least a portion of a text content in the electronic message as relevant to the workflow.

Step 808 includes requesting an input from the second party to update a workflow associated with the workflow. In some embodiments, step 808 is optional, wherein other options may include automatically determining that the system should update the workflow.

Step 810 includes updating the workflow associated with the workflow based on at least one of the document attached to the electronic message or the portion of the text content in the electronic message, when the second party provides the input. In some embodiments, step 810 includes verifying that a signature field in the document attached to the electronic message matches a signature of the first party stored in the database. In some embodiments, step 810 includes sending an electronic message to each of multiple parties associated with the workflow, including the first party and the second party. In some embodiments, step 810 includes providing to the second party an option to preserve an approval from at least one reviewer who has already approved the workflow.

Step 812 includes storing the document attached to the electronic message in a database as a new version of the workflow. In some embodiments, step 812 includes encrypting the document and including an old version of the workflow. In some embodiments, step 812 includes displaying, for the second party, a log history of multiple actions associated to the workflow. In some embodiments, step 812 includes receiving, from the second party, an authorization to access incoming electronic messages in the first networking platform.

Figure 9:
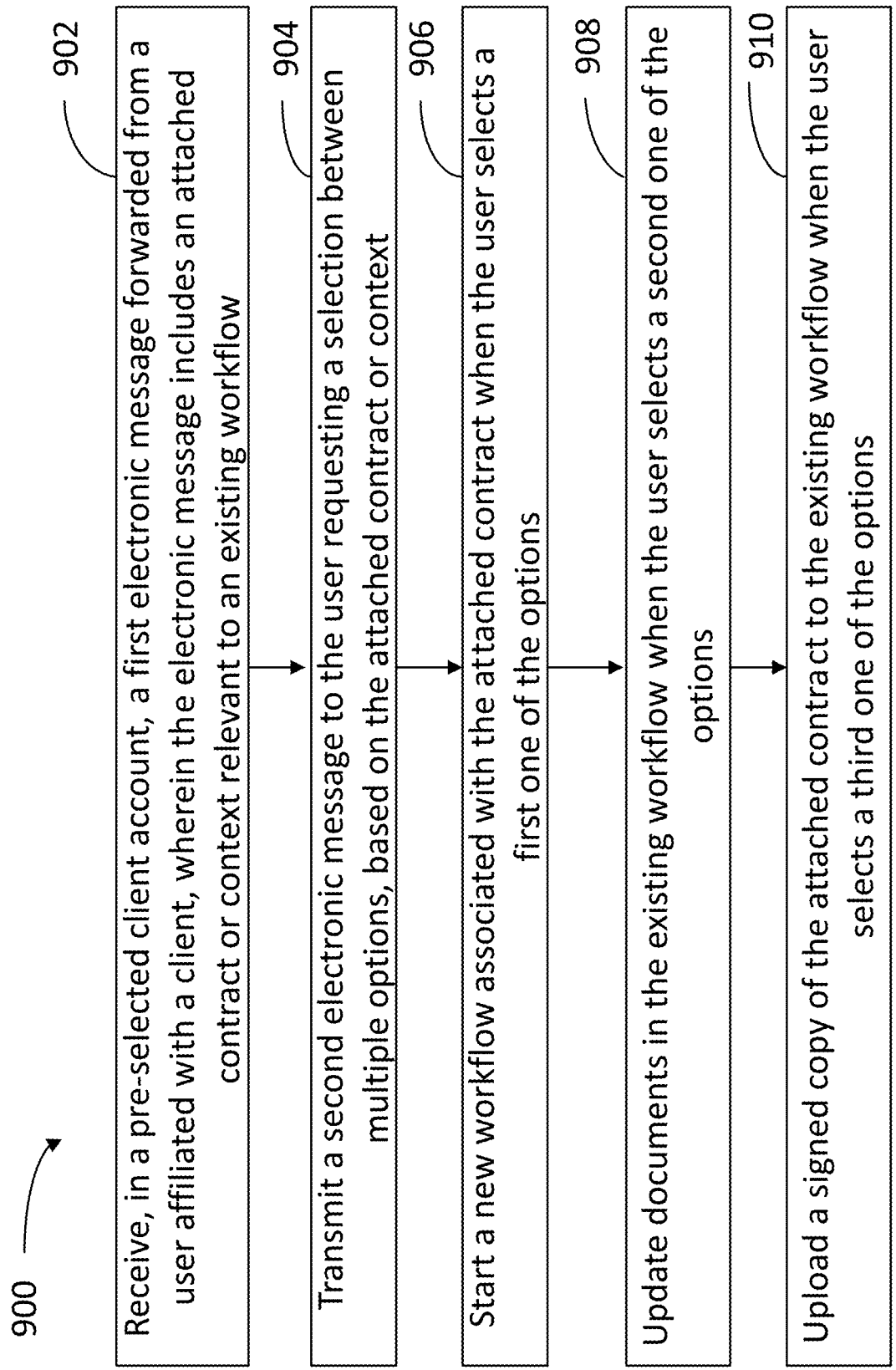
FIG. 9 is a flow chart illustrating steps in a method for receiving and managing electronic message attachments between parties in a smart contract network, according to some embodiments.

FIG. 9 illustrates steps in a method for receiving and managing electronic message attachments between parties in a smart contract network, according to some embodiments. Method 900 may be performed at least partially by any one of the server and client device illustrated in FIGS. 1 and 2. For example, at least some of the steps in method 900 may be performed by one component in a system including a client device running code for a browser and an application to access the server or the database (e.g., contract engine 242, browser 227, or algorithm 248). Accordingly, at least some of the steps in method 900 may be performed by a processor executing commands from tools and algorithms stored in a memory of the server or of the client device, or accessible by the server or by the client device (e.g., processors 212, memories 220, networking tool 244, settings tool 245, editor tool 246, attributes tool 247, and algorithm 248). Further, in some embodiments, at least some of the steps in method 900 may be performed overlapping in time, almost simultaneously, or in a different order from the order illustrated in method 900. Moreover, a method consistent with some embodiments disclosed herein may include at least one, but not all, of the steps in method 900.

Step 902 includes receiving, in a pre-selected client account, a first electronic message forwarded from a user affiliated with a client, wherein the electronic message includes an attached contract or context relevant to an existing workflow.

Step 904 includes transmitting a second electronic message to the user requesting a selection between multiple options, based on the attached contract or context. In some embodiments, step 904 may include transmitting information including, but not limited to, metadata, or a preview link, related to one or more existing workflows.

Step 906 includes starting a new workflow associated with the attached contract when the user selects a first one of the options.

Step 908 includes updating documents in the existing workflow when the user selects a second one of the options.

Step 910 includes uploading a signed copy of the attached contract to the existing workflow when the user selects a third one of the options.

Hardware Overview

Figure 10:
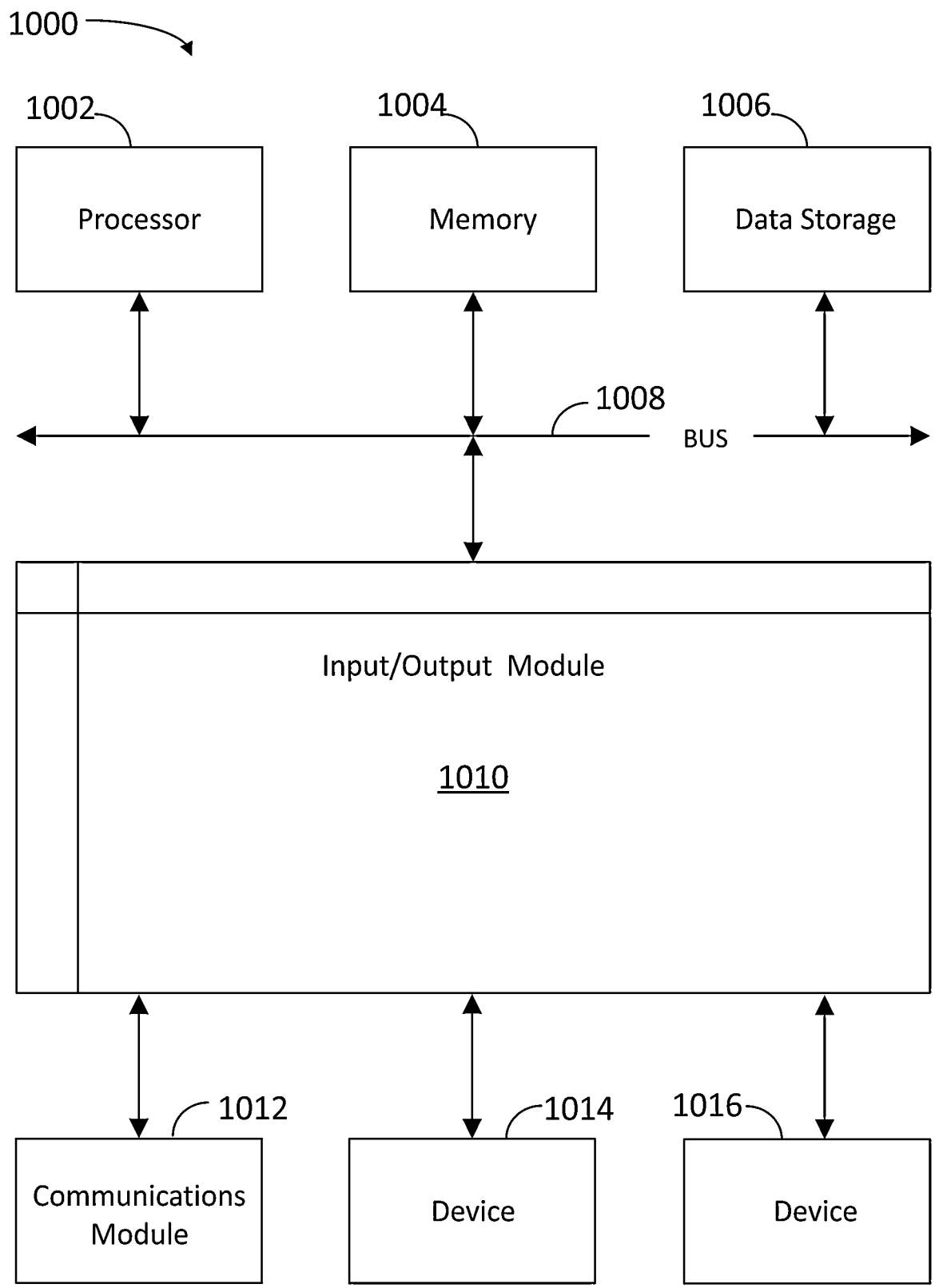
FIG. 10 is a block diagram illustrating an example computer system with which the client and server of FIGS. 1 and 2 and the methods of FIGS. 8-9 can be implemented.

FIG. 10 is a block diagram illustrating an exemplary computer system 1000 with which the client and server of FIGS. 1 and 2, and the methods of FIGS. 9-10 can be implemented. In certain aspects, the computer system 1000 may be implemented using hardware or a combination of software and hardware, either in a dedicated server, or integrated into another entity, or distributed across multiple entities.

Computer system 1000 (e.g., client 110 and server 130) includes a bus 1008 or other communication mechanism for communicating information, and a processor 1002 (e.g., processors 212) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications modules 218) include networking interface cards, such as Ethernet cards and modems. In certain aspects, input/output module 1010 is configured to connect to a plurality of devices, such as an input device 1014 (e.g., input device 214) and/or an output device 1016 (e.g., output device 216). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, and/or one or more paragraphs.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each clause. Rather, as the clauses reflect, inventive subject matter lies in less than all features of a single disclosed configuration or operation. The clauses are hereby incorporated into the detailed description, with each clause standing on its own as a separately described subject matter.

The clauses are not intended to be limited to the aspects described herein, but are to be accorded the full scope consistent with the language clauses and to encompass all legal equivalents. Notwithstanding, none of the clauses are intended to embrace subject matter that fails to satisfy the requirements of the applicable patent law, nor should they be interpreted in such a way.

What is claimed is:

1. A computer-implemented method comprising:
accessing, by a contract platform via a tool configured to interact with a plurality of third-party networking platforms, an electronic messaging platform to identify one or more electronic messages associated with a workflow;

based on identifying the one or more electronic messages associated with the workflow, retrieving, by the contract platform, a first electronic message associated with the workflow;

identifying a first document attached to the first electronic message associated with the workflow as an updated version of a document associated with the workflow, wherein identifying the first document attached to the first electronic message comprises matching metadata in the first document with a prior version of the first document stored in a database;

verifying whether the first document is legitimate by determining whether the first document can be decrypted using a decryption key;

based on a verification that the first document is legitimate and that the first electronic message is associated with the workflow, identifying at least a portion of the first document that comprises one or more action items;

updating the workflow associated with the document based on the one or more identified action items;

storing the first document attached to the first electronic message in the database as a new version of the document; and causing, by the contract platform, an output to be displayed on a first computing device indicating the update to the workflow and the one or more identified action items.

2. The computer-implemented method of claim 1, further comprising:

verifying, after retrieving the first electronic message, that the first document attached to the first electronic message has not been tampered by an unauthorized third party.

3. The computer-implemented method of claim 1, wherein updating the workflow associated with the document comprises verifying that a signature field in the first document matches a stored signature of a first party.

4. The computer-implemented method of claim 1, wherein updating the workflow associated with the document comprises sending an electronic message parties associated with the workflow.

5. The computer-implemented method of claim 1, wherein the one or more identified action items comprise providing an option to preserve an approval from at least one reviewer who has already approved the document.

6. The computer-implemented method of claim 1, wherein storing the first document attached to the first electronic message in the database comprises:

encrypting the first document in a block; and adding the block to a block-string including a prior version of the document.

7. The computer-implemented method of claim 1, further comprising:

causing, by the contract platform, a log history of multiple actions associated with the document to be displayed on the first computing device.

8. The computer-implemented method of claim 1, further comprising:

receiving, prior to accessing the electronic messaging platform, authorization, from a second computing device, to access the electronic messaging platform.

9. A computing device, comprising:

one or more processors; and memory storing instructions that, when executed by the one or more processors, cause the computing device to:

access, by a contract platform via a tool configured to interact with a plurality of third-party networking platforms, an electronic messaging platform to identify one or more electronic messages associated with a workflow;

based on identifying one or more electronic messages associated with the workflow, retrieve, by the contract platform, a first electronic message associated with the workflow;

identify a first document attached to the first electronic message associated with the workflow as an updated version of a document associated with the workflow, wherein identifying the first document attached to the first electronic message comprises matching metadata in the first document with a prior version of the first document stored in a database;

verify whether the first document is legitimate by determining whether the first document can be decrypted using a decryption key;

based on a verification that the first is legitimate and that the first electronic message is associated with the workflow, identify at least a portion of the first document that comprises one or more action items;

update the workflow associated with the document based on the one or more identified action items;

store the first document attached to the first electronic message in the database as a new version of the document; and cause, by the contract platform, an output to be displayed on a first computing device indicating the update to the workflow and the one or more identified action items.

10. The computing device of claim 9, wherein the instructions, when executed by the one or more processors, cause the computing device to verify, after retrieving the first electronic message, that the first document attached to the first electronic message has not been tampered by an unauthorized third party.

11. The computing device of claim 9, wherein the instructions, when executed by the one or more processors, cause the computing device to update the workflow associated with the document by verifying that a signature field in the first document matches a stored signature of a first party.

12. The computer-implemented method of claim 1, wherein the one or more identified action items comprise at least one of:

a review of changes made to the first document;

a review of a signature added to the first document; or a request for a signature.

13. The computing device of claim 9, wherein the one or more identified action items comprise at least one of:

a review of changes made to the first document;

a review of a signature added to the first document; or a request for a signature.

14. The computer-implemented method of claim 1, wherein the identifying the one or more electronic messages associated with the workflow further comprises:

verifying that a source and a recipient of the one or more electronic messages are parties to a contract associated with the workflow.

15. The computer-implemented method of claim 1, wherein the identifying the one or more electronic messages associated with the workflow further comprises:

determining, from a context of the one or more electronic messages, that the one or more electronic messages are associated with the workflow.

* * * * *